2,922,418

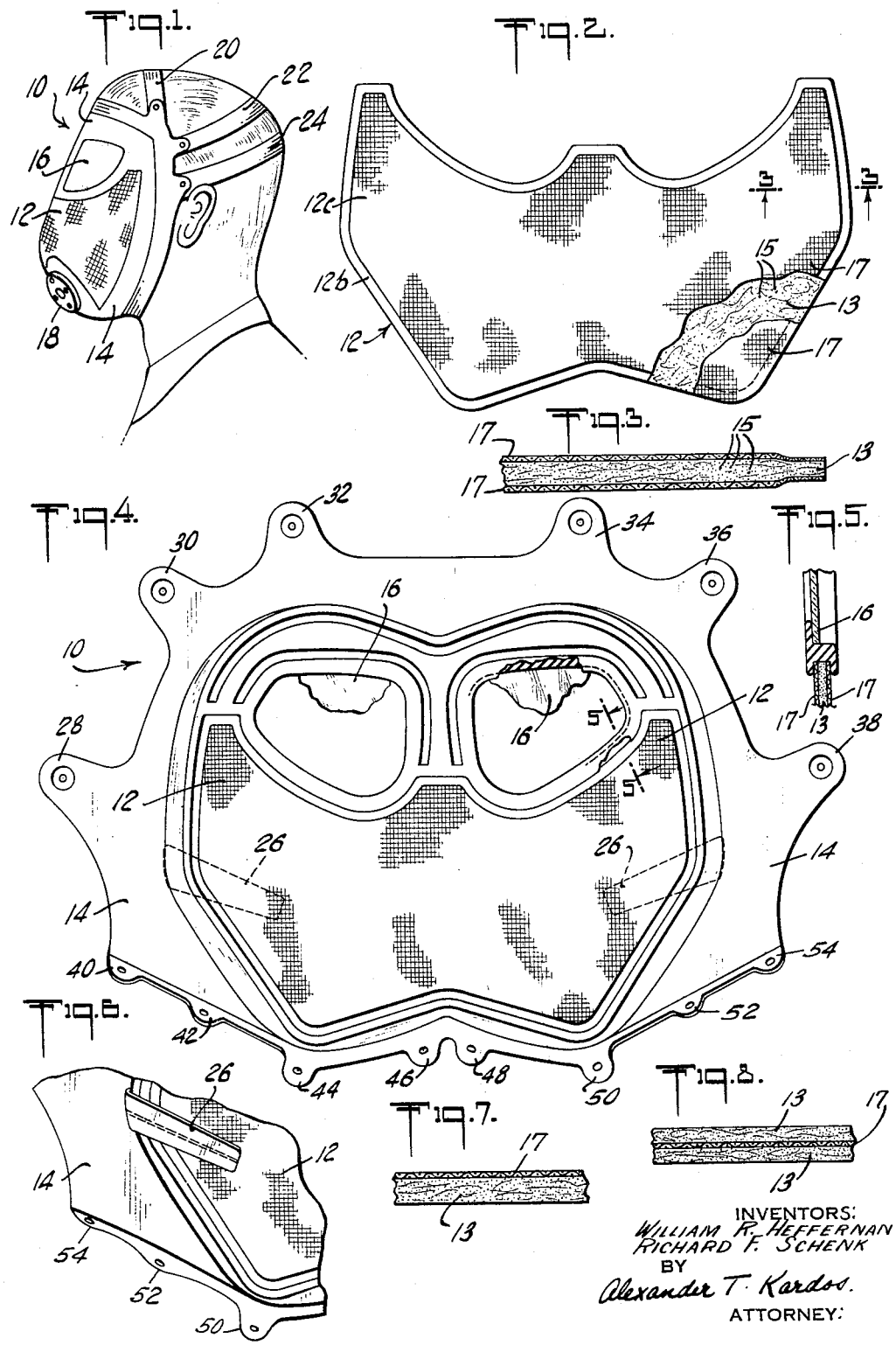

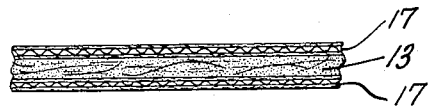
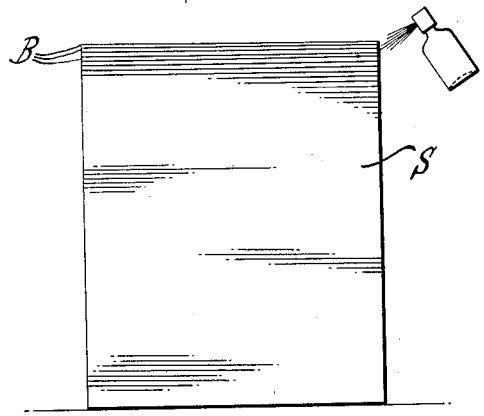
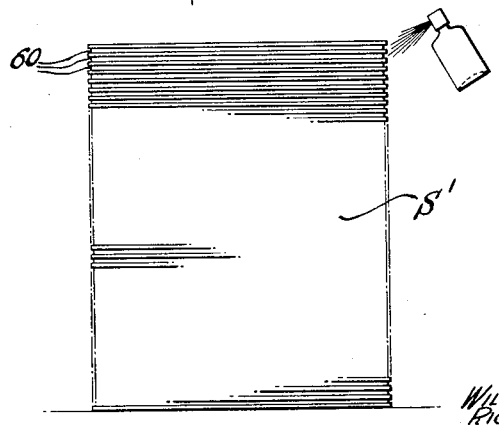

AIR-PERMEABLE PRODUCT AND METHOD OF MAKING THE SAME

William R. Heffernan, Westfield, and Richard F. Schenk, New Market, N.J., assignors to Johnson & Johnson, a corporation of New Jersey Application December 24, 1956, Serial No. 630,144

6 Claims. (Cl. 128—141)

The present invention relates to improved methods of molding plastic or rubber-like materials to fibrous materials and to the resulting products. More particularly, the present invention relates to improved methods of molding plastic or rubber-like materials to the edge of the fibrous face-piece of a gas mask and to the resulting improved gas mask.

In copending application, Serial Number 360,918, filed June 11, 1953, methods and apparatus are disclosed for carrying out such molding operations generally. These methods and apparatus and the resulting products have been hitherto satisfactorily employed but it has been discovered that rough usage and careless mishandling of the products, and particularly their creasing and folding in a small radius of curvature, have resulted in the cracking or rupture of parts of the fibrous materials. As a result, leakage has occurred and the air-permeability and diffusion characteristics of such materials have been undesirably affected. With reference particularly to gas masks, air leakage has resulted and the protective absorption and filtering properties have been substantially lost.

It is a principal purpose of the present invention to provide improved articles of manufacture comprising flexible, fibrous materials having plastic or rubber-like materials molded thereto, which articles will better withstand rougher usage and more mishandling than previous articles of a similar nature.

It is a further principal purpose of the present invention to provide improved articles of manufacture comprising flexible, air-permeable, fibrous materials which can be creased or folded in relatively small radii of curvature without cracking or undesirably affecting their air-permeability, diffusion or filtering characteristics.

It is a still further principal purpose of the present invention to provide improved methods of manufacturing such articles whereby the fibrous materials are permanently molded to the plastic or rubber-like materials in a strong, rugged bond capable of withstanding rough usage and mishandling.

These purposes and other objects which will become clear hereinafter are accomplished by bonding the edge portion of the flexible, fibrous materials; reinforcing the same with at least one and preferably two similarly shaped pieces of screening material; compressing the superimposed materials in a border portion thereof; coating at least a substantial part or all of the border portion of the superimposed materials with a bonding agent; and then molding the plastic or rubber-like material to the edge of the superimposed materials.

In the accompanying drawings and the following specification, there is illustrated and described a gas mask representing a preferred embodiment of the inventive concept, but it is to be understood that such is primarily for illustrative purposes and that the invention in its broader aspects is not to be construed as limited thereto. Referring to the accompanying drawing:

Figure 1 is a general perspective showing of a person wearing a gas mask incorporating the features and advantages of the present invention;

Figure 2 is a detailed showing of the flexible, air-permeable, fibrous face-piece blank of a gas mask as shown in Figure 1;

Figure 3 is a fragmentary cross-section of the face-piece blank taken from the line 3—3 of Figure 2;

Figure 4 is a showing of the complete gas mask blank, as molded, in relatively flattened condition prior to its folding into the shape in which it is used, such as shown in Figure 1;

Figure 5 shows details of the eye-piece construction of the gas mask blank of Figure 4, taken on the line 5—5 of Figure 4;

Figure 6 shows details of the chin strap construction;

Figure 7 is a fragmentary cross-section of a modification of the face-piece blank, similar to the view in Figure 3;

Figure 8 is a fragmentary cross-section of another modification of the face-piece blank, similar to the view in Figure 3;

Figure 9 is a fragmentary cross-section of still another modification of the face-piece insert blank, similar to the view in Figure 3;

Figure 10 illustrates a phase in the manufacture of the invention product wherein the face-piece blanks are stacked and the edges thereof are being sprayed; and Figure 11 illustrates another phase in the manufacture of the invention product wherein the face-piece blanks are stacked and the border edges are being sprayed.

In the embodiment of the invention shown in the drawings and with particular reference to Figures 1 and 4, the gas mask 10 comprises an air-permeable face-piece insert 12 and an air-impermeable, face-contacting rim 14 of plastic or rubberlike material molded thereto and surrounding the face-piece insert. Eyepieces 16, an exhaling valve 18 and a harness comprising elastic straps 20, 22 and 24 are provided and are of known construction. A chin strap (or straps) 26 (see Figures 4 and 6) provides for more secure positioning of the gas mask when in use.

Tabs 28, 30, 32, 34, 36 and 38 are provided in the flanged bead or rim 14 and are used to secure the elastic harness straps 20, 22 and 24 to the face portion of the gas mask.

Tabs 40, 42, 44, 46, 48, 50, 52 and 54 are provided on the flanged bead or rim 14 to facilitate the welding of the chin section of the gas mask into the final configuration, as in actual use.

The face-piece insert 12 includes a fabric-filter portion 13 which may comprise any flexible, air-permeable, fabricated material which is capable of permitting the passage of air. It may comprise a woven, knitted or non-woven fabric, provided the necessary air-permeability properties described previously are obtainable. The preferred form of fabric filter portion is a carded or random-laid non-woven fabric which can be manufactured in large sheets from which can be blanked out the particular shape of the face-piece insert.

The fabric filter portion 13 of the face-piece insert is impregnated with any suitable type of absorbent 15 or adsorbent, preferably in particulate form, in order to filter out and prevent the passage of undesirable gases and solids. A preferred filtering material for impregnating the face-piece insert has been found to be activated charcoal particles, but it is to be appreciated that any other form of filtering material can be employed.

The fabric filter portions 13 of the face-piece inserts may be blanked out of the stock material to the required shape by any desired punching or dieing operation. The material may have any desired thickness, dependent upon the particular use intended. For use as a gas mask, it has been found that thicknesses of from about 0.050 inch to about 0.400 inch are satisfactory, with a preferred range of from about 0.175 to about 0.250 inch.

After the fabric filter portions 13 of the face-piece inserts have been blanked out, they are edge-coated to strengthen, stiffen and bond them for subsequent processing. For ease of operation and to increase production rates, they are formed into stacks S (see Figure 10), being interleaved with non-sticking materials, such as silicone-coated paper, and are coated in stack form. The non-sticking materials are also trimmed to the same size and shape as the face-piece inserts so that they do not interfere with the edge coating operation.

The exposed cut edges of the stack of blanks B are sprayed lightly (see Figure 10) with a latex or similar aqueous dispersion of rubber or polymerization product of rubber-like substance or emulsified plastic. The spraying is very light in order that there be substantially no penetration of the sprayed material into the fabric. A thin, substantially invisible coating is preferred; a heavy coating visible to the eye is not desired.

The particular coating which is sprayed in the exposed edges may be selected from a wide range of synthetic resins and similar materials possessing aqueous emulsifiability and having relatively low heat sensitivity of thermoplasticity. Such materials are capable of use as bonding agents and adhesive and would include materials such as "Koroseal," a plasticized, highly polymerized vinyl chloride; "Marvinol," a vinyl compound elastomer with plasticizer; the "Vinylite" series of synthetic thermoplastic resins such as the vinyl chloride polymerization products and the vinyl chloride-vinylidene chloride copolymerization products; "Geon" 576, a vinyl polymerization product; "Geon" 100, a special polymer of vinyl chloride; "Geon" 200, a special copolymer of vinyl chloride and vinylidene chloride; or similar vinyl synthetic polymerization copolymerization products.

Although such materials are in the vinyl family, it is to be appreciated that other materials which possess the desired elastic and deformability properties could be used. For example, the natural and synthetic rubber products are applicable, as well as the polyethylene polymerization products.

Following the edge spraying, the individual blanks of the stack are separated and permitted to dry, either in a heated atmosphere or by ordinary air drying.

A laminated sandwich is then built up from the number and types of materials desired in the finished product. For example, a 5-ply sandwich may be prepared consisting of outer plies of non-sticking materials such as silicone-coated paper, and edge-coated fabric filter portion 13 and two die-cut inserts of vinyl polymerization product coated "Fiberglas" mesh screen material or screening 17. The particular coating for the "Fiberglas" screening may be selected from a wide range of materials including those set forth hereinbefore as well as any other synthetic or natural material compatible therewith. Materials other than "Fiberglas" may be used as the screening, provided the necessary strength and heat and dimensional stability are present. Nylon (synthetic polyamide), for example, has been found to be satisfactory.

The next step in the procedure is to compress the border portions 12b of the laminated plies so that they become adherent and more or less integral. This is readily accomplished in a suitable press which may be heated to facilitate the compression. The final thickness of the compressed border portion is a fraction of the original thickness, on the order of from about ⅕ to about ½. The width of the compressed border portions will depend upon the molding techniques and apparatus to be employed and the ultimate use of the resulting product. In most situations, a border width of from about ⅛ to about ½ inch and preferably from about ¼ inch to about ⅜ inch has been found satisfactory.

A stack S' (see Figure 11) of these sandwiches having compressed border portions and coated edges is then formed, with each sandwich separated from the adjacent sandwich by a resilient material such as cellulose sponge or a sponge rubber insert 60 which is smaller in size all around than the sandwich itself and provides a cushioning effect thereto during the stacking. This stack of sandwiches is then pressed together to hold all the individual elements together and is sprayed with an adhesive stiffening material to form a heavy, visible coating. This adhesive stiffening material may be selected from a wide range of materials, including those previously mentioned as well as any other materials which would be compatible therewith. The heavy coating covers the edges of the sandwich and extends over the compressed border portion but does not extend materially to the inner portion which is located within the border portion, being prevented from doing so by the sponge rubber separator.

The stack of sandwiches is then allowed to dry thoroughly and is then re-heated and used in the plastic injection molding apparatus more particularly described in copending application, Serial Number 360,918, filed June 11, 1953.

The molded product then resembles the more or less flattened article illustrated in Figure 4. It is then subjected to further processing wherein it is folded and welded to a shape to conform to the human head. Elastic straps (usually about ⅝ inch wide) are secured to the appropriate tabs for properly positioning the gas mask during use. An exhaling valve is placed within the lower tabs and positioned for use, as shown in Figure 1. The chin straps are adhered together to assist in the final positioning of the gas mask during use. Eyepieces are installed in the openings provided therefor. The gas mask is then ready for use.

The invention will be further illustrated in greater detail by the following specific examples. It should be understood, however, that although these examples may describe in particular detail some of the more specific features of the invention, they are given primarily for purposes of illustration and the invention in its broader aspects is not to be construed as limited thereto.

*Example 1*

The fabric filter portion of the face-piece insert is blanked out of 0.200 inch stock non-woven fabric sheets containing activated charcoal as the filtering material. The blanks are then stacked and the exposed edges are lightly sprayed with an aqueous dispersion of "Geon" 576 (a synthetic thermoplastic vinyl resin polymerization product). The coating is thin and practically invisible. There is substantially no penetration into the fabric. The blanks are then air-dried.

Blanks of a similar size and shape of vinyl resin-coated "Fiberglas" screen are cut from stock screening (approximately 18 x 14 mesh).

A sandwich of two outer plies of the screening blank 17 and one central ply of the fabric blank 13 is placed within non-sticking silicone paper sheets and pressure is applied thereto along a border area measuring about ¼ inch wide. The force applied is about ½ ton and is maintained for about 30 seconds at 275–300° F. The thickness of the border area after compression is about 0.085 inch. Such a face-piece insert is illustrated in Fig. 3.

The face-piece inserts are built up into a stack and are interleaved with ¼ inch thick sponge rubber separators. These rubber separators have the same general shape as the face-piece inserts but are sufficiently smaller so that the compressed ¼ inch border area is exposed. These exposed border areas and the edges are then sprayed more heavily than previously with an aqueous emulsion of "Geon" 576. The coating is visible and about 0.015 inch. After air-drying, the stack is broken down and the face-piece inserts are ready for the molding operation.

The face-piece inserts are then heated for about 30 seconds to make them more flexible and they are then introduced into a molding device wherein a face-contacting rim is injection molded thereto. Such molding processes are described in greater detail in copending application, Serial Number 360,918, filed June 11, 1953.

The plastic molding material is "Geon" injection molding powder (a vinyl chloride polymerization product) but could be any synthetic thermoplastic resin polymerization product compatible with "Geon" 576.

The inner edges or lands of the molding device apply pressure over a portion of the compressed border area extending from about 3/32 to about 7/32 of an inch in from the edge. In this way, the plastic material effectively covers the outer edge of the face-piece insert and extends inwardly over the border area to a depth of 3/32 inch. Substantially no splaying of fibers of the face-piece insert is noted nor is there any substantial flashing of plastic material inwardly of the lands.

The face-piece inserts are capable of being bent into configurations having relatively small radii of curvature without cracking or rupturing and without undesirably affecting its air-permeability or filtering properties.

*Example II*

Following the procedures of Example I but using only one reinforcing "Fiberglas" screening 17 on the outer surface of the fabric insert 13 (Fig. 7), a face-piece insert is obtained of less strength and durability but which is capable of being molded into an acceptable gas mask by techniques described in Example I.

*Example III*

Following the procedures of Example I but using "Geon" 200 (a synthetic thermoplastic vinyl chloride-vinylidene chloride resin copolymerization product) for the face-piece insert preparation, an acceptable gas mask is obtained.

*Example IV*

The procedures set forth in Example I are followed substantially as set forth therein with the exception that a modification of the face-piece insert is employed.

The face-piece insert of this example comprises three layers basically: one central ply of a non-woven fabric 13 impregnated with acid activated charcoal and two outer reinforcing plies, each consisting of a central layer of "Fiberglas" screening 17 and two outer layers of non-woven fabrics derived from a mixture of synthetic fibers. Such a face-piece insert is illustrated in Figure 9. The use of such a face-piece insert leads to an increase of surface strength and scuff resistance.

Still another modification of the face-piece insert is suggested in Fig. 8. In this construction, the insert is made up of a central layer of screening material 17 and two outer layers of fabric filter material 13.

It is to be noted in the preceding examples that the bonding, coating and molding materials have all been derived from the same general family of polymerization products. In other words, the material used to coat the screening, the material used to bond the edge portion of the face-piece insert, the material used to coat the border portions, and the material used to form the surrounding rim all come from the same family and are compatible with each other.

An additional requirement of these materials is that, in addition to being compatible with each other, they be compatible with the material used as the filtering material.

The gas masks of the present invention have been found to be particularly effective for civilian use and especially applicable for the evacuation of personnel from gassed areas. It affords protection against lachrymators, sternutators, pulmonary irritants, nerve gases, and is of use in atomic warfare in the filtering of particulate materials and preventing their entrance to the lungs. As an industrial gas mask, it is of value against smokes, ammonia fumes, many organic gases, etc.

The strength and ruggedness imparted to the face-piece insert by the flexible screening has increased the useful life of the gas mask many times and has extended its application to many fields requiring such stronger and more rugged construction.

Although several specific examples of the inventive concept have been described, the same should not be construed as limited thereby nor to the specific substances mentioned therein but to include various other compounds of equivalent constitution as set forth in the claims appended hereto. It is understood that any suitable changes, modifications and variations may be made without departing from the spirit and scope of the invention.

We claim:

1. An article of manufacture comprising a flexible, air-permeable, fibrous sheet material including an inner portion and a border portion; a flexible, air-permeable mesh screen material of different construction and greater strength than said sheet material and being disposed in contact with and reinforcing said sheet material and having an inner portion and a border portion substantially coextensive with the inner portion and the border portion of said sheet material; an adhesive material covering the border portions of said sheet material and said screen material but not extending to the inner portions thereof whereby said border portions are adhered and said inner portions remain separate, flexible and air-permeable; and a plastic rim molded to said border portions and compatible with said adhesive thereon.

2. An article of manufacture comprising a flexible, air-permeable, fibrous sheet material including an inner portion, a border portion and an edge portion; an adhesive coating covering said edge portion; a flexible, air-permeable mesh screen material of different construction and greater strength than said sheet material and being disposed in contact with and reinforcing said sheet material and having an inner portion, a border portion and an edge portion substantially coextensive with the inner portion, border portion and the edge portion of said sheet material; an adhesive material compatible with said adhesive coating covering the border portions and edge portions of said sheet material and screen material but not extending to the inner portions thereof whereby said border and edge portions are adhered and said inner portions remain separate, flexible and air-permeable; and a plastic rim molded to said border and edge portion and compatible with said adhesive coating and adhesive material thereon.

3. A gas mask comprising a flexible, air permeable, fibrous face-piece including an inner portion and a border portion; a flexible, air-permeable mesh screen material of different construction and greater strength than said face piece and being disposed in contact with and reinforcing said face-piece and having an inner portion and a border portion substantially coextensive with the inner portion and the border portion of said face-piece; an adhesive material covering the border portions of said face-piece and screen material but not extending to the inner portions thereof whereby said border portions are adhered and said inner portions of the face-piece remain separate, flexible and air-permeable; and a plastic rim molded to said border portion and compatible with said adhesive thereon.

4. A gas mask comprising a flexible, air-permeable, fibrous face-piece including an inner portion, a border portion and an edge portion; an adhesive coating covering said edge portion; a flexible, air-permeable mesh screen material of different construction and greater strength than said face piece and being disposed in contact with and reinforcing said face-piece and having an inner portion, a border portion and an edge portion substantially coextensive with the inner portion, border portion and the edge portion of the face-piece; an adhesive material covering the border portions and edge portions of said face-piece and screen material but not extending to the inner portions thereof whereby said border and edge portions are adhered and said inner portions of the face-piece remain separate, flexible and air-permeable; and a plastic rim molded to said border and edge portion and compatible with said adhesive thereon.

5. A method of molding a plastic rim to the edge of a flexible, air-permeable, fibrous sheet material which comprises bonding the edge portion of said sheet material with an adhesive coating without bonding the border and inner portions thereof; reinforcing said sheet material by positioning a flexible, air-permeable mesh screen material of different construction and greater strength than said sheet material in contact with said sheet material, said screen material having an inner portion, a border portion and an edge portion substantially coextensive with the inner portion, the border portion and the edge portion of said sheet material; compressing said sheet material and said screen material in the border portions thereof; coating said border portions with a bonding agent compatible with said adhesive coating; and molding plastic material to the compressed border portions, said plastic material being compatible with said adhesive coating and said bonding agent and being prevented from extending past said compressed portions to the inner portions of said sheet material and said screen material.

6. A gas mask comprising a flexible, air-permeable, fibrous face-piece including an inner portion and a border portion; an absorbent material impregnating said face-piece and acting as a filter to prevent undesirable materials from passing therethrough; a flexible, air-permeable mesh screen material of different construction and greater strength than said face piece and being disposed in contact with and reinforcing said face-piece and having an inner portion and a border portion substantially coextensive with the inner portion and the border portion of said face-piece; an adhesive material covering the border portions of said face-piece and screen material but not extending to the inner portions thereof whereby said border portions are adhered and said inner portions of the face-piece remain separate, flexible and air-permeable; and a plastic face-contacting rim molded to said border portion and compatible with said adhesive thereon.

References Cited in the file of this patent

UNITED STATES PATENTS

| | | |
|---|---|---|
| 38,255 | Hoffmann | Sept. 25, 1866 |
| 787,167 | Gates | Apr. 11, 1905 |
| 1,292,096 | Schwartz | Jan. 21, 1919 |
| 1,313,745 | Schwartz | Aug. 19, 1919 |
| 2,422,725 | Gilfillan | June 24, 1947 |
| 2,424,777 | Stuart | July 29, 1947 |
| 2,481,602 | Lindh | Sept. 13, 1949 |
| 2,495,045 | Woodbury et al. | Jan. 17, 1950 |
| 2,775,967 | Sovinsky | Jan. 1, 1957 |

UNITED STATES PATENT OFFICE
CERTIFICATE OF CORRECTION

Patent No. 2,922,418                                January 26, 1960

William R. Heffernan et al.

It is hereby certified that error appears in the printed specification of the above numbered patent requiring correction and that the said Letters Patent should read as corrected below.

Column 8, list of References Cited, under UNITED STATES PATENTS, for the patent number "38,255" read -- 58,255 --.

Signed and sealed this 19th day of July 1960.

(SEAL)
Attest:

KARL H. AXLINE                                      ROBERT C. WATSON
Attesting Officer                                    Commissioner of Patents